INFORMATION PROCESSING SYSTEMS

Filed Dec. 30, 1968 2 Sheets-Sheet 1

INVENTOR.
CHRISTOS B. KAPSAMBELIS
BY Peter Xiarhos
AGENT

Sept. 22, 1970 C. B. KAPSAMBELIS 3,530,433

INFORMATION PROCESSING SYSTEMS

Filed Dec. 30, 1968 2 Sheets-Sheet 2

INVENTOR.
CHRISTOS B. KAPSAMBELIS
BY
Peter Xiarhos
AGENT

United States Patent Office 3,530,433

Patented Sept. 22, 1970

3,530,433

INFORMATION PROCESSING SYSTEMS

Christos B. Kapsambelis, Canton, Mass., assignor to Sylvania Electric Products Inc., a corporation of Delaware Filed Dec. 30, 1968, Ser. No. 787,813
Int. Cl. G06f *11/10;* G06k *5/00*
U.S. Cl. 340—146.1 17 Claims

ABSTRACT OF THE DISCLOSURE

Parity-checking apparatus for use in coded-vehicle identification systems. A retroreflective label to be affixed to a vehicle is coded to represent a plurality of digits $a_0 \ldots a_n$, each having a value between 0 and 9, and a parity check integer $R_C$ having a value determined in accordance with an arithmetic error-checking code in the following manner:

the digits $a_0 \ldots a_n$ in the even positions (counting from the right, starting with the units digit) are taken with their actual decimal values;

the digits $a_0 \ldots a_n$ in the odd positions (again counting from the right) are multipiled by 2;

the sum of the digits in the even positions and the units and tens digits of the products derived as a result of operating on the digits in the odd positions is then obtained; and the units digit of the sum is ascertained and subtracted from 10 to derive the value of the parity check integer $R_C$.

The above-mentioned coded label is scanned by scanning apparatus, and successive coded signals representative of and corresponding in value to the digits $a_0 \ldots a_n$ and the parity check integer $R_C$ are produced and applied to parity-checking apparatus in accordance with the present invention. In the parity-checking apparatus, the coded signals representative of the digits $a_0 \ldots a_n$ in the even positions (counting from the right) are taken with their actual values, and the values of the coded signals in the odd positions (again counting from the right) are multiplied by 2. A sum is then obtained of the values of the coded signals in the even positions, the values of the units and tens digits of the products obtained by operating on the values of the coded signals in the odd positions, and the value of the coded signal representative of the parity check integer $R_C$. If the value of the units digit of the resultant sum is equal to zero, the coded signals satisfy system parity requirements.

BACKGROUND OF THE INVENTION

The present invention relates to information processing systems and, more particularly, to parity-checking apparatus for use in coded-vehicle identification systems.

In existing coded-vehicle identification systems it is often necessary or desirable to provide some means for varifying whether coded information has been correctly sensed from or transmitted by a vehicle to be identified at a particular location. A wide variety of apparatus is presently available for determining the correctness of coded information received or sensed from a coded vehicle. Such apparatus includes pulse and binary digit counting apparatus, redundancy polling apparatus, monitoring apparatus for recognizing codes of a predetermined format (for example, m-out-of-n codes), algebraic code parity-checking apparatus, and arithmetic code parity-checking apparatus.

The present invention is primarily concerned with parity-checking apparatus and, more particularly, with parity-checking apparatus of the arithmetic code type. One well known type of arithmetic code, known as the "powers-of-two modulo-eleven" arithmetic error-detecting code, has been described in detail in a co-pending patent application of Henry N. Weiss, Ser. No. 687,774, filed Dec. 4, 1967, and entitled "Parity-Checking Apparatus for Coded-Vehicle Identification Systems" and also in a co-pending patent application of Gordon B. Sorli and Sergio Calderon, Ser. No. 687,823, filed Dec. 4, 1967, and entitled "Parity-Checking Apparatus for Coded-Vehicle Identification Systems," both of the above-mentioned applications being assigned to the same assignee as the present application.

As disclosed in each of the above-mentioned applications, a label to be affixed to a vehicle to be identified at a particular label-reading location is encoded to represent a plurality of digits $a_0 \ldots a_n$, each of the digits $a_0 \ldots a_n$ having a value between 0 and 9, and a parity check integer having a value related to the values of the plurality of digits $a_0 \ldots a_n$. The value of the parity check integer to be encoded in the label is determined in accordance with the aforementioned powers-of-two modulo-eleven error-detecting code by multiplying the values of the digits $a_0 \ldots a_n$ by increasing powers of two, summing the individual products, and dividing the sum by 11. The remainder resulting from division of the summed products by 11 represents the value of the parity check integer corresponding to the particular values of the digits $a_0 \ldots a_n$. The above-described powers-of-two modulo-eleven error-detecting arithmetic code has been found to be very satisfactory for use in error-checking apparatus for coded-vehicle identification systems since, when implemented by suitable parity-checking apparatus, compensating errors and transpositional errors in a multi-digit coded message can be readily detected.

It has been recognized, however, that another arithmetic error-detecting code, referred to herein as the "UIC arithmetic code" because of its acceptance for use in coded-vehicle identification systems in Western Europe by the Union Internationale des Chemins de Fer (International Union of Railways), may also be used effectively for error-checking purposes in coded-vehicle identification systems. Briefly, in accordance with the UIC arithmetic code, the value of a parity check integer $R_C$ to be encoded in a message together with a plurality of digits $a_0 \ldots a_n$, each having a value between 0 and 9, is determined as follows: (a) the digits in the even positions (counting from the right) are taken with their actual decimal values (equivalent to multiplying by 1); (b) the values of the digits in the odd positions (again counting from the right) are multiplied by 2; (c) a sum of the values of the digits in the even positions and of the units and tens digits of the products derived by multiplying the values of the digits in the odd positions by 2 is then obtained; and (d) the value of the units digit of the sum is subtracted from 10 to derive the value of the parity check integer $R_C$.

Mathematically, the above-described arithmetic operations (a) through (d) may be given by the following expressions:

Operations (a) through (b)

$$K \ldots +a_{n-3}+2a_{n-2}+a_{n-1}+2a_n$$

where $K=a_0$ for an even number of digits or $K=2a_0$ for an odd number of digits;

Operation (c)

$\Sigma=a_{n-1}+a_{n-3}+ \ldots +$(sum of values of units and tens digits, if any, of product $2a_n$)+(sum of values of units and tens digits, if any, of product $2a_{n-2}$)+etc.$=10T+U$ where U is the value of the units digit of the sum and T is the value of the tens digit of the sum;

and

Operation (d)

$$10-U=R_C$$

The present invention, therefore, contemplates, and it is a principal object of the present invention, to provide a parity-checking apparatus for coded-vehicle identification systems which is capable of ascertaining whether coded signals representative of a plurality of coded digits $a_0 \ldots a_n$ and a parity check integer $R_C$ satisfy basic system parity requirements in accordance with the above-described UIC arithmetic code.

BRIEF SUMMARY OF THE INVENTION

Briefly, the present invention relates to a system for processing information relating to an object, for example, a railway vehicle. In accordance with the present invention, a plurality of code elements are associated with the object and arranged in a predetermined coded pattern so as to represent a plurality of integers $a_0 \ldots a_n$ relating to the object, each integer having a given value, and a parity check integer having a value related to the values of the integers $a_0 \ldots a_n$. Means are provided to sense each of the integers $a_0 \ldots a_n$ and the parity check integer encoded in the plurality of code elements and to produce a signal representative thereof, each of the signals having a value corresponding to the value of the associated integer. To determine whether the signals representative of the integers $a_0 \ldots a_n$ and the parity check integer have been properly derived from the plurality of code elements, a parity-checking apparatus is provided in accordance with the present invention for operating on the signals.

The parity-checking apparatus includes a control means which is operative to produce first control signals corresponding to predetermined ones of the signals representative of the integers $a_0 \ldots a_n$ and second control signals corresponding to the remaining ones of the signals representative of the integers $a_0 \ldots a_n$. Each of the signals representative of an integer $a_0 \ldots a_n$ and a corresponding first or second control signal from the control means is applied to a circuit means. The circuit means operates in response to receiving each first control signal from the control means and a corresponding predetermined one of the signals representative of the integers $a_0 \ldots a_n$ to provide an output signal of a value bearing a predetermined first relationship to the value of the corresponding signal and, in response to receiving each second control signal from the control means and a corresponding remaining one of the signals representative of the integers $a_0 \ldots a_n$, to provide an output signal of a valve bearing a predetermined second relationship to the value of the corresponding signal.

Each output signal provided by the circuit means is received by an arithmetic means connected to the circuit means and added therein to a signal then present in a storage means connected to the arithmetic means. An output signal is then provided by the arithmetic means to the storage means having a value bearing a predetermined relationship to the sum of the values of the output signal provided by the circuit means and the signal stored in the storage means. Each output signal provided by the arithmetic means is applied to and stored in succession in the storage means.

To conclude the determination as to whether the signals representative of the integers $a_0 \ldots a_n$ and the parity check integer have been properly derived from the code elements, the value of the last signal stored in the storage means after processing the signals representaitve of the integers $a_0 \ldots a_n$ is checked by means included in the parity-checking apparatus against the value of the signal representaitve of the parity check integer. If the values of the signals bear a predetermined relationship to each other, a predetermined output condition is produced indicating that system parity requirements have been satisfied.

Figure 1:
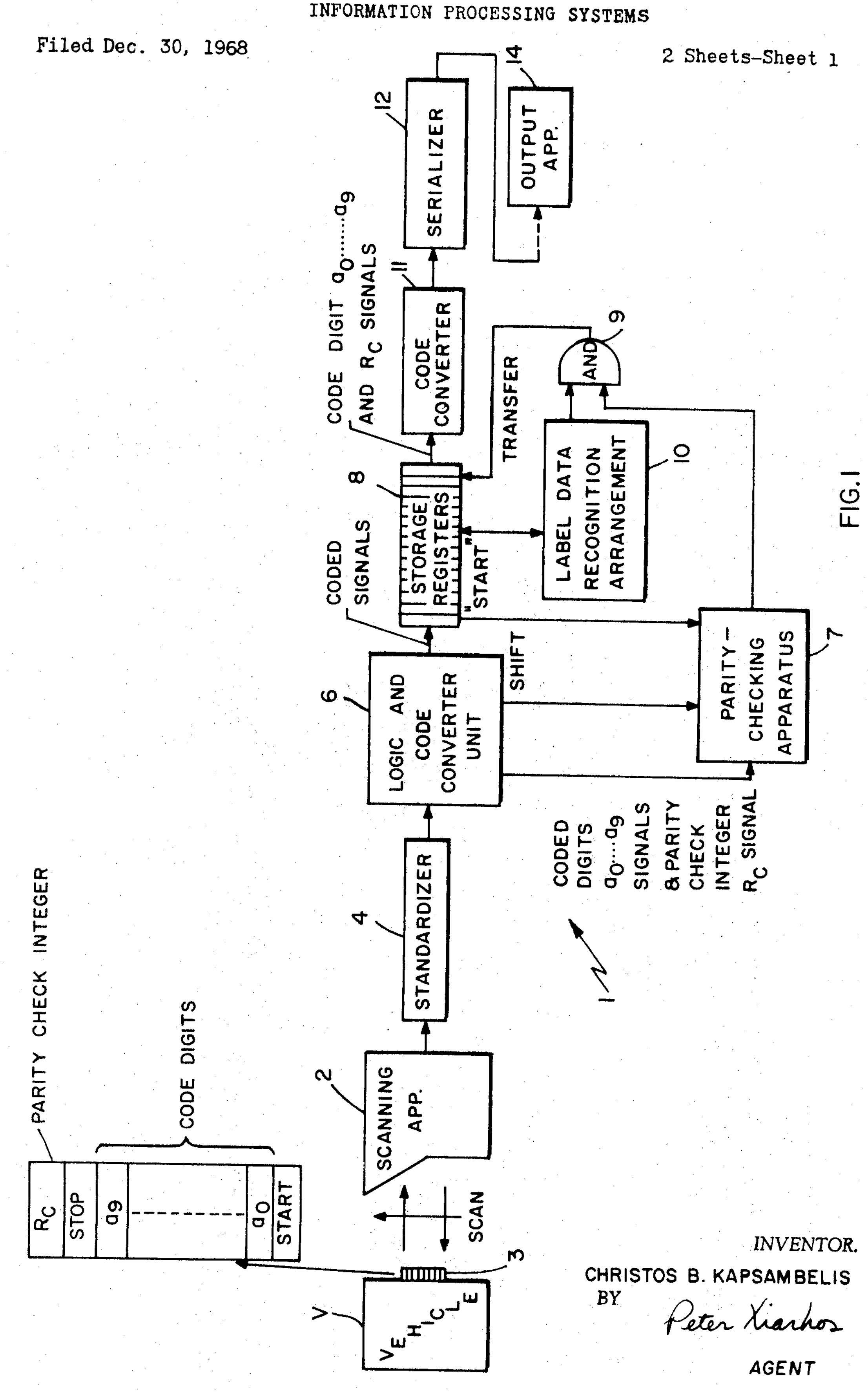
FIG. 1 is a schematic block diagram representation of a coded-vehicle identification system employing parity-checking apparatus in accordance with the present invention.

Coded-vehicle identification system—FIG. 1

Referring to FIG. 1, there is shown in schematic block diagram form a coded-vehicle identification system 1 employing a parity-checking apparatus 7 in accordance with the present invention. As shown in FIG. 1, the coded-vehicle identification system 1 includes a scanning apparatus 2 adapted to vertically scan a coded label 3 affixed to a vehicle V and to produce signals representative of the items of information encoded in the label 3. As shown in blown-up pictorial form in FIG. 1, the items of information encoded in the label 3 typically include a START control word, ten code digits $a_0 \ldots a_9$, a STOP control word, and a parity check integer $R_C$.

A standardizer 4 connected to the scanning apparatus 2 operates to convert the signals from the scanning apparatus 2 into signals having standardized amplitude, and a logic and code converter unit 6 connected to the standardizer 4 operates to convert the standardized signals from the standardizer 4 into binary-coded signals which are successively applied to and stored in a plurality of storage registers 8. Various ones of the binary-coded signals produced by the logic and code converter unit 6, namely, the coded signals representative of the digits $a_0 \ldots a_9$ and the parity check integer $R_C$, are also applied in succession to the parity-checking apparatus 7. SHIFT signals corresponding to the coded signals are also generated by the logic and code converter unit 6 and applied to the parity-checking apparatus 7.

As will be explained in detail hereinafter, the parity-checking apparatus 7 operates under control of the SHIFT signals generated by the logic and code converter 6 and a "START" signal from the plurality of storage registers 8 to determine the correctness or incorrectness of the coded information derived from the label 3 by the scanning apparatus 2. If the information derived from the coded label 3 is determined to be correct by the parity-checking apparatus 7, an output signal is produced thereby and applied to an AND gate 9. A second input signal is received by the AND gate 9 from a label data recognition arrangement 10 upon a determination being made by the label data recognition arrangement 10 at the conclusion of a label-reading operation that the contents of the storage registers 8 pertain to valid label data as opposed to "noise." When both input signals are received by the AND gate 9, a TRANSFER signal is produced by the AND gate 9 and applied to the plurality of storage registers 8 to transfer the coded signals representative of the digits $a_0 \ldots a_9$ and the parity check integer $R_C$ into a code converter 11. If no TRANSFER signal is produced by the AND gate 9, the transfer of the coded signals is prevented.

The code converter 11 serves to convert the binary-coded signals from the plurality of storage registers 8 into signals suitable for further processing. A serializer 12 connected to the code converter 11 translates the signals from the code converter 11 into a serial form, which signals are then applied to a suitable output apparatus 14.

Coded label—FIG. 1

The coded label 3 of FIG. 1 is preferably of a retroreflective type such as described in detail in U.S. Pat. No.

3,225,177 to Francis H. Stites and Raymond Alexander or, alternatively, in a co-pending patent application of Francis H. Stites and Bradstreet J. Vachon, Ser. No. 745,585, filed July 17, 1968, and entitled "Mark Sensing System," the abovementioned patent and application being assigned to the same assignee as the present application.

Briefly, the coded label 3 is fabricated from rectangular orange, blue, and white retroreflective stripes, and nonretroreflective black stripes. The orange, blue, and white retroreflective stripes have the capability of reflecting an incident light beam back along the path of incidence. The black stripes effectively lack such a capability of retroreflection. The label 3 is suitably coded, for example, in a two-position base-four code, by various two-stripe combinations of the retroreflective orange, blue, and white stripes and the non-retroreflective black stripes, to represent, in a sequential format, the aforementioned items of information, namely, the START control word, the plurality of digits $a_0$ through $a_9$, the STOP control word, and the parity check integer $R_C$. Typically, each of the coded digits $a_0 \ldots a_9$ may have a decimal value between 0 and 9. The above-described rectangular label stripes are mounted in a vertical succession, each stripe having a horizontal orientation, on the side of the vehicle V.

The decimal value of the parity check integer $R_C$ encoded in the label 3 of FIG. 1 is determined from the above-described UIC arithmetic code by performing the required operations on the values of the digits $a_0 \ldots a_9$ in the manner previously indicated. Thus, in accordance with the previous discussion of the UIC arithmetic code, the digits $a_0$, $a_2$, $a_4$, $a_6$, and $a_8$ (i.e., the "even" position digits, counting from the right) are taken with their actual decimal values, and the values of the digits $a_1$, $a_3$, $a_5$, $a_7$, and $a_9$ (i.e., the "odd" position digits, counting from the right) are multiplied by 2. The sum of $a_0$, $a_2$, $a_4$, $a_6$, and $a_8$, and the units and tens digits (if any) of the products $2a_1$, $2a_3$, $2a_5$, $2a_7$, and $2a_9$ is then derived. The value of the units digit of the sum is then subtracted from 10 to derive the value of the parity check integer $R_C$ corresponding to the particular values selected for the digits $a_0 \ldots a_9$.

Detailed operation—FIG. 1

The detailed manner of operation of the coded-vehicle identification system 1 of FIG. 1 is as follows. When the vehicle V bearing the coded retroreflective label 3 passes the scanning apparatus 2, the scanning apparatus 2 scans the multiple stripes of the label 3 in succession and produces a plurality of successive pulse signals representative of the coded label information, that is, the START control word, the digits $a_0 \ldots a_9$ information, the STOP control word, and the parity check integer $R_C$ information. Although not shown in FIG. 1, the scanning apparatus 2 typically includes a source of light and a rotating wheel having a plurality of mirrors mounted on its periphery. As the drum rotates, the mirrors cause a beam of light to vertically scan the coded label 3 from bottom to top, the light reflected from the stripes of the label 3 being returned to the mirrors and then divided by a dichroic optical system (not shown) into orange and blue "channels" for application to respective sensors, the output pulse signals from which are applied to the standardizer 4. For additional or more specific details regarding the scanning apparatus 2, reference may be made to the above-cited patent to Stites and Alexander.

The standardizer 4 may be of a type described in detail in U.S. Pat. No. 3,299,271 to Francis H. Stites, also assigned to the assignee of the present application. Although reference to the above patent to Stites may be made for specific details, the standardizer 4 operates to measure the widths at the half-amplitude points of the individual pulse signals received in succession from the scanning apparatus 2, as the retroreflective stripes of the coded label 3 are successively scanned, and to convert the pulse signals measured at the half-amplitude points into signals having a uniform, standardized amplitude.

The signals processed by the standardizer 4, representative of the START control word, the digits $a_9 \ldots a_9$ information, the STOP control word, and the parity check integer $R_C$ information, are applied to the logic and code converter unit 6 wherein each block of information (in two-position base four code) is converted in a manner described in detail in the above-cited patent to Stites and Alexander to a binary-coded signal comprising four bits. The coded four-bit signals from the logic and code converter unit 6 are applied in succession to the plurality of storage registers 8, individual registers being used to store the four-bit codes representative of the START control word, the digits $a_0 \ldots a_9$, the STOP control word, and the parity check integer $R_C$. Additionally, the coded signals representative of the digits $a_0 \ldots a_9$ and the parity check integer $R_C$, together with corresponding SHIFT signals, are also applied by the logic and code converter unit 6 in succession to the parity-checking apparatus 7.

To determine the validity of the information derived from the coded label 3, that is, whether the information derived from the coded label 3 by the scanning apparatus 2 is correct, a "START" signal representative of the coded START signal stored in the first register of the plurality of storage registers 8 is applied to the parity-checking apparatus 7 to initate operation thereof, and the four-bit coded signals representative of the digits $a_0 \ldots a_9$ and the parity-check integer $R_C$ are then individually and successively applied by the logic and code converter unit 6 to the parity-checking apparatus 7 together with the corresponding SHIFT signals.

The SHIFT signals from the logic and code converter unit 6 serve to cause the parity-checking apparatus 7 to alternately multiply the values of the incoming coded signals by 1 and by 2. More particularly, the values of the coded signals corresponding to the digits $a_0$, $a_2$, $a_4$, $a_6$, and $a_8$, and to the parity check integer $R_C$ are multiplied in the parity-checking apparatus 7 by 1 (in other words, taking the aforementioned signals with their actual values), and the values of the coded signals corresponding to the digits $a_1$, $a_3$, $a_5$, $a_7$, and $a_9$ are multiplied by 2. As will become more fully apparent from a detailed discussion of FIG. 2, the parity-checking apparatus 7 further derives a resultant of the products obtained from the preceding operations, including adding together the values of the individual digits comprising any product having a value equal to or exceeding 10. The value of the digit in the units position of the sum is ascertained and checked against the value of the coded signal representative of the parity check integer $R_C$. If the sum of the digit in the units position and the value of the coded signal representative of the parity check integer $R_C$ is equal to 10, thereby indicating that the coded signals derived by the scanning apparatus 2 from the label 3 are correct, an output signal is produced by the parity-checking apparatus 7 and applied as a first input signal to the first input of the AND gate 9.

At the same time that the parity-checking apparatus 7 operates to determine whether the coded signals representative of the digits $a_0 \ldots a_9$ and the parity check integer $R_C$ are correct, the contents of the plurality of storage registers 8 are examined by the label data recognition arrangement 10 to determine whether the contents pertain to label data only and not to spurious "noise" signals which may resemble valid label signals. Suitable apparatus which may be used to perform the above-mentioned examination of the contents of the registers 8 is disclosed in detail in a co-pending patent application of Francis H. Stites and Bradstreet J. Vachon, S.N. 386,328, filed July 30, 1964, and entitled "Mark Sensing System" or, alternatively, in a co-pending patent application of Christos B. Kapsambelies, S.N. 767,213, filed Oct. 14, 1968, and entitled "Information Processing Systems", both of the above-mentioned applications being assigned to the same assignee as the present application.

If, at the termination of the label-reading operation, the contents of the storage registers 8 are determined by the label data recognition arrangement 10 to pertain to label data only, an output signal is produced thereby and applied as a second input signal to the AND gate 9. An output TRANSFER signal is then produced by the AND gate 9 to transfer the coded signals representative of the digits $a_0 \ldots a_9$ and the parity check integer $R_C$ to the code converter 11. In the event the contents of the registers 8 are determined by the label data recognition arrangement 10 not to pertain to label data only, no output signal is produced thereby and, hence, no output TRANSFER signal is produced by the AND gate 9 to transfer the contents of the registers 8 into the code converter 11.

The code converter 11 serves to convert the four-bit coded signals in the plurality of storage registers 8, as verified by the parity-checking apparatus 7, into any suitable code arrangement, for example, a five-level teletypewriter code. The serializer 12 converts the coded signals from the code converter 11 into a serial train of pulses which are then applied via a direct communication or other suitable communication link to appropriate local or remote output apparatus 14, for example, a computer or printout device.

Figure 2:
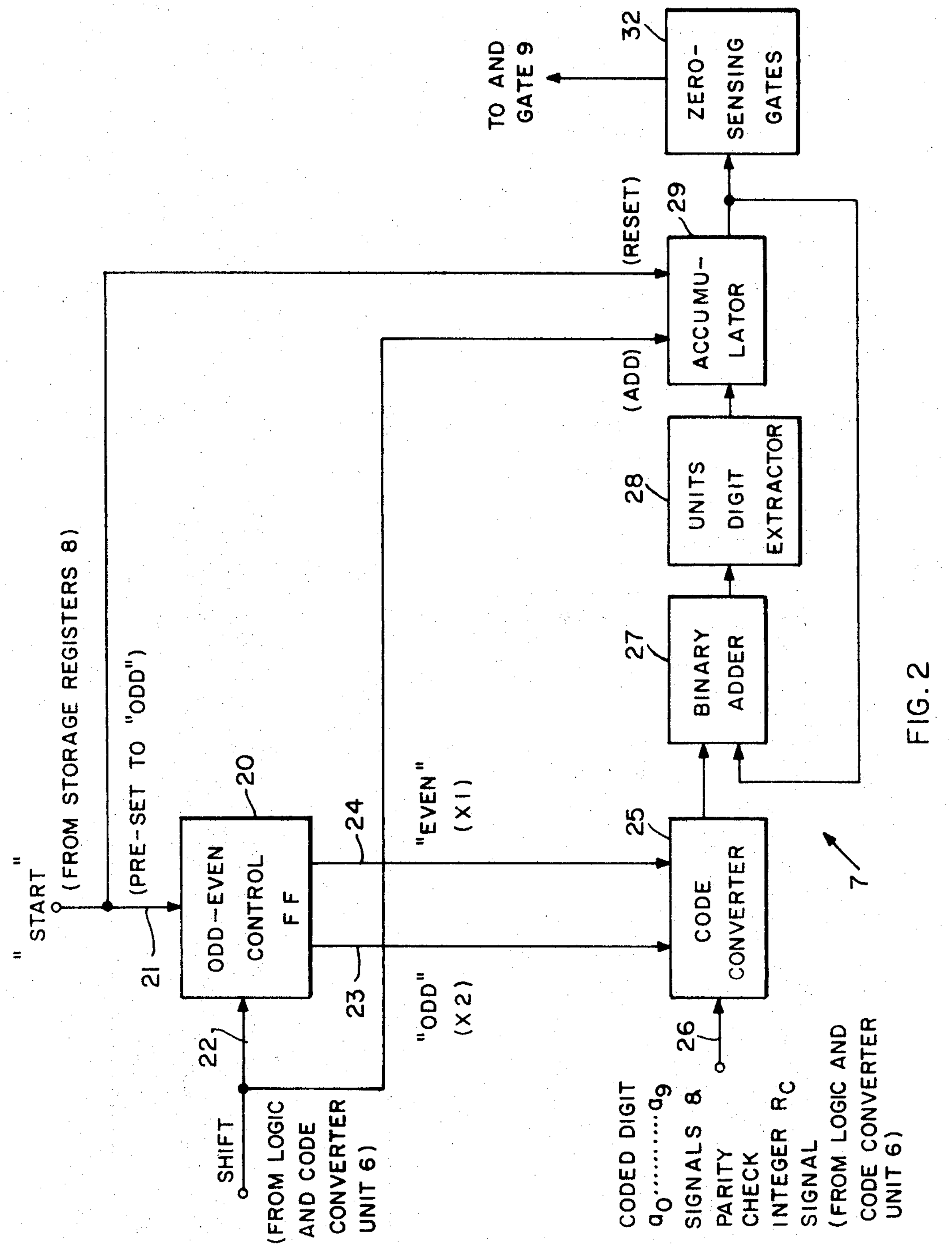
FIG. 2 is a more detailed showing of the parity-checking apparatus of FIG. 1.

Parity-checking apparatus 7—FIG. 2

The parity-checking apparatus 7 of FIG. 1 is shown in greater detail in FIG. 2. As shown therein, the parity-checking apparatus 7 includes an ODD-EVEN control flip-flop circuit 20 having a first input line 21 for receiving the "START" signal from the storage registers 8, a second input line 22 for receiving the SHIFT signals in succession from the logic and code converter unit 6, and a pair of output lines 23 and 24. The ODD-EVEN control flip-flop 20, in response to receiving successive SHIFT signals over the input line 22, switches alternately between its two stable states and provides alternating output control signals, designated in FIG. 2 as "ODD" and "EVEN," on the output lines 23 and 24 to a code converter 25 connected to the output lines 23 and 24. As will become fully apparent hereinafter, the ODD-EVEN flip-flop 20 is initially pre-set to a predetermined first state (its "ODD" state) by the "START" signal from the storage registers 8 such that the first SHIFT signal applied to the ODD-EVEN flip-flop 20 (corresponding to the coded signal representative of the digit $a_0$) causes an "EVEN" control signal to be produced and to be applied to the code converter 25.

The code converter 25, which receives the coded signals representative of the digits $a_0 \ldots a_9$ and the parity check integer $R_C$ over an input line 26, operates in response to the "ODD" and "EVEN" control signals produced by the ODD-EVEN flip-flop 20 to alternately multiply the values of the coded signals representative of the digits $a_0 \ldots a_9$ and the parity check integer $R_C$ by 1 and by 2. More particularly, the code converter 25 multiplies the value of a coded signal by 1 (that is, taking the coded signal with its actual value) in response to an "EVEN" control signal from the ODD-EVEN control flip-flop 20, or by 2 in response to an "ODD" control signal from the ODD-EVEN control flip-flop 20, these operations corresponding to the general expressions for "Operations (a) and (b)" previously set forth in the section entitled "Background of the Invention." The code converter 25 additionally operates to add together in a binary fashion the values of the individual digits comprising a product having a value equal to or exceeding 10. This operation satisfies in part the general expression for "Operation (c)" previously set forth in the section entitled "Background of the Invention."

The above-described operations of the code converter 25 may be performed by various types of apparatus. A particularly suitable apparatus, however, is a hard-wired code conversion apparatus which is capable of converting a binary-coded input signal coinciding with a first signal (e.g., an "EVEN" signal) directly to a binary-coded output signal of the same value as the binary-coded input signal, and of converting a binary-coded input signal coinciding with a second signal (e.g., an "ODD" signal) to a binary-coded output signal having a value equal to the sum of the values of the individual units and tens digits of a quantity representing a value twice that of the binary-coded input signal. Although such a code-conversion apparatus is not shown herein, a truth table for such apparatus is given below.

| Value of input coded signal | Outputs of code conversion apparatus | |
|---|---|---|
| | Even | Odd |
| 0000 (0) | 0000 (0) | 0000 (0) |
| 0001 (1) | 0001 (1) | 0010 (2) |
| 0010 (2) | 0010 (2) | 0100 (4) |
| 0011 (3) | 0011 (3) | 0110 (6) |
| 0100 (4) | 0100 (4) | 1000 (8) |
| 0101 (5) | 0101 (5) | 0001 (1) |
| 0110 (6) | 0110 (6) | 0011 (3) |
| 0111 (7) | 0111 (7) | 0101 (5) |
| 1000 (8) | 1000 (8) | 0111 (7) |
| 1001 (9) | 1001 (9) | 1001 (9) |

The binary-coded output signals produced by the code converter 25 are applied to a first input of a binary adder 27. The binary adder 27, of a conventional type, operates to add together in a binary fashion the value of each individual coded signal received from the code converter 25 at a first input thereof and a coded signal received at a second input thereof and then present in an accumulator 29. As will become apparent hereinafter, a command (ADD) for initiating each addition operation in the binary adder 27 is provided on the trailing edge of each SHIFT signal produced by the logic and code converter unit 6.

Initially, that is, prior to the coded signals representative of the digits $a_0 \ldots a_9$ and the parity check integer $R_C$ being processed by the code converter 25, the accumulator 29 is reset to a count of zero by the "START" signal from the storage registers 8. This resetting clears the accumulator 29 of any stored count which may have been present as a result of a previous operation of the system. The accumulator 29 may be a conventional storage register or any other storage means having a capacity for storing a single binary-coded signal.

Each binary-coded output signal produced by the binary adder 27 is applied to a units digit extractor 28. The units digit extractor 28 operates to "extract" the value of the units digit in each binary-coded signal produced by the binary adder 27. For example, if a binary-coded signal is applied to the units digit extractor 28 having a value of 10, a binary-coded signal is produced by the units digit extractor 28 having a value of 0; if a binary-coded signal is applied to the units digit extractor 28 having a value of 3, a binary-coded output signal is produced by the units digit extractor 28 having a value of 3, etc. As will become fully apparent hereinafter, the greatest value that a signal may have in the present system is 9. Therefore, the maximum value of a coded signal that can be applied by the binary adder 27 to the units digit extractor 28 is 18 (9+9=18). Although the operation of the units digit extractor 28 may be performed by many types of apparatus, a hard-wired code conversion apparatus is considered to be particularly suitable. A truth table for such an apparatus is given below.

| Value of coded input signal | Output of units digit extractor |
|---|---|
| 0000-1001 (0-9) | 0000-1001 (0-9) |
| 01010 (10) | 0000 (0) |
| 01011 (11) | 0001 (1) |
| 01100 (12) | 0010 (2) |
| 01101 (13) | 0011 (3) |
| 01110 (14) | 0110 (4) |
| 01111 (15) | 0101 (5) |
| 10000 (16) | 0110 (6) |
| 10001 (17) | 0111 (7) |
| 10010 (18) | 1000 (8) |

Each binary-coded output signal produced by the units digit extractor 28 is applied to the accumulator 29 and stored therein. As discussed previously, when an ADD command is given to the accumulator 29, the coded signal stored therein is transferred to the binary adder 27 and added therein to a coded signal from the code converter 25. As will be explained hereinafter, the contents of the accumulator 29 are sensed by zero-sensing gates 32 which produce an output signal to the AND gate 9 (FIG. 1) when a count of 0 is sensed in the accumulator 29.

Detailed operation of parity-checking apparatus 7—FIG. 2

The detailed manner of operation of the parity-checking apparatus 7 of FIG. 2 will now be described. The following values of the digits $a_0 \ldots a_9$ as received from the logic and code converter unit 6 will be arbitrarily assumed:

$$a_0=4 \text{ (even)}$$
$$a_1=8 \text{ (odd)}$$
$$a_2=2 \text{ (even)}$$
$$a_3=6 \text{ (odd)}$$
$$a_4=7 \text{ (even)}$$
$$a_5=9 \text{ (odd)}$$
$$a_6=8 \text{ (even)}$$
$$a_7=1 \text{ (odd)}$$
$$a_8=3 \text{ (even)}$$
$$a_9=5 \text{ (odd)}$$
$$a_0a_1a_2a_3a_4a_5a_6a_7a_8a_9=4826798135$$

To derive a value for the parity check integer $R_C$ corresponding to the above values of $a_0 \ldots a_9$, the even digits are taken with their actual value (multiply by 1) and the odd digits are multiplied by 2, the units and tens digits of any product equal to or greater than 10 being added together. Thus, $$4\times1=4$$
$$8\times2=16$$
$$2\times1=2$$
$$6\times2=12$$
$$7\times1=7$$
$$9\times2=18$$
$$8\times1=8$$
$$1\times2=2$$
$$3\times1=3$$
$$5\times2=10$$

Then, the individual digits are summed together $$4+\underbrace{1+6}_{16}+2+\underbrace{1+2}_{12}+7+\underbrace{1+8}_{18}+8+2+3+\underbrace{1+0}_{10}=46$$

To determine the value for $R_C$, the units digit 6 of the above sum 46 is subtracted from 10 to give $R_C=4$ Operation of the parity-checking apparatus 7 with the above values of the digits $a_0 \ldots a_9$ and the parity check integer $R_C$ is initiated by the "START" signal from the storage registers 8. The "START" signal resets the accumulator 29 to 0 (0000) on the leading edge thereof and, also on the leading edge, presets the ODD-EVEN flip-flop circuit 20 to a state whereby an "ODD" signal is produced on the output line 23. Since no coded signal is present on the input line 26 of the code converter 25 at this time, the "ODD" signal has no effect on the code converter 25 and no operations are performed by the code converter 25.

After the operation of the parity-checking apparatus 7 is initiated, a coded signal representative of the first digit $a_0=4$ (0100) is applied to the code converter 25. A first SHIFT signal (corresponding to the coded signal representative of the digit $a_0$) is produced by the logic and code converter unit 6 and, on the leading edge thereof, the ODD-EVEN flip-flop 20 is operated to a state whereby an "EVEN" signal is produced on the line 24. The value of the coded signal ($a_0=4=0100$) is then converted by the code converter 25 to a coded output signal having the same value, and the coded output signal is applied to the binary adder 27.

On the trailing edge of the first SHIFT signal, an ADD command is given to the accumulator 29 and the contents thereof (0=0000) are transferred therefrom and added to the contents ($a_0=4=0100$) of the binary adder 27. The addition in the binary adder 27 yields a sum of 4 (0100) which is applied, in a binary-coded signal form, to the units digit extractor 28. A binary-coded signal representative of a count of 4 is applied by the units digit extractor 28 to the accumulator 29 and stored therein.

A coded signal representative of the second digit $a_1=8$ (1000) is then applied by the logic and code converter unit 6 to the code converter 25 and a second SHIFT signal (corresponding to the coded signal representative of the digit $a_1$) is produced by the logic and code converter unit 6 and applied to the ODD-EVEN flip-flop 20 and to the accumulator 29. On the leading edge of the second SHIFT signal, an "ODD" signal is produced by the ODD-EVEN flip-flop 20 and the code converter 25 is operated to provide a coded output signal to the binary adder 27 having a value of 7 ($2\times8=16$, $1+6=7=0111$). On the trailing edge of the second SHIFT signal (ADD command), the existing contents of the accumulator 29 (4=0100) are added to the contents of the binary adder 27 to produce a sum signal having a value of 11 (7+4=11=01011). The sum signal in the binary adder 27 of a value of 11 is applied to the units digit extractor 28, the units digit 1 is extracted from the sum of 11, and applied to and stored in the accumulator 29.

In the same manner as described hereinabove, the coded signals representative of the digits $a_2 \ldots a_9$ are applied in succession to the code converter 25 and SHIFT signals are applied to the ODD-EVEN flip-flop 20 and to the accumulator 29 to cause further operations of the above-described nature to take place. Although the operation of the parity-checking apparatus 7 of FIG. 2 will not be described in detail for the remaining digits $a_2 \ldots a_9$, the following table, setting forth the output values of the code converter 25, the binary adder 27, the units digit extractor 28, and the contents of the accumulator 29 after processing each of the coded signals representative of the digits $a_2 \ldots a_9$, may be established.

| Digit | Putput of code converter 25 | Output of binary adder 27 | Output of units digit extractor 28 | Contents of accumu-lator 29 |
|---|---|---|---|---|
| $a_2=2$ (0010) | $2\times1=2$ (0010) | 2+1=3 (0011) | 3 (0011) | 3 (0011) |
| $a_3=6$ (0110) | $6\times2=12=3$ (0011) | 3+3=6 (0110) | 6 (0110) | 6 (0110) |
| $a_4=7$ (0111) | $7\times1=7$ (0111) | 7+6=13 (01101) | 3 (0011) | 3 (0011) |
| $a_5=9$ (1001) | $9\times2=18=9$ (1001) | 9+3=12 (01100) | 2 (0010) | 2 (0010) |
| $a_6=8$ (1000) | $8\times1=8$ (1000) | 8+2=10 (01010) | 0 (0000) | 0 (0000) |
| $a_7=1$ (0001) | $1\times2=2$ (0010) | 2+0=2 (0010) | 2 (0010) | 2 (0010) |
| $a_8=3$ (0011) | $3\times1=3$ (0011) | 3+2=5 (0101) | 5 (0101) | 5 (0101) |
| $a_9=5$ (0101) | $5\times2=10=1$ (0001) | 1+5=6 (0110) | 6 (0110) | 6 (0110) |

It may be noted from the above table that after the coded signals representative of the digits $a_0$ . . . $a_9$ have been processed by the parity-checking apparatus 7, the accumulator 29 stores a count of 6 (0110). To verify the information derived from the coded label 3, the coded signal from the logic and code converter unit 6 representative of the parity check integer $R_C$ ($R_C$=4=0100) is then applied to the code converter 25 and a SHIFT signal (corresponding to the coded signal representative of the parity check integer $R_C$) is produced and applied to the ODD-EVEN control flip-flop 20 and to the accumulator 29. On the leading edge of the SHIFT signal, an "EVEN" control signal is produced by the ODD-EVEN flip-flop 20 (the previous SHIFT signal corresponding to the coded signal representative of the digit $a_9$) and the code converter 25 is operated to provide a coded output signal to the binary adder 27 having a value of 4 (4×1=4=0100).

On the trailing edge of the SHIFT signal (ADD command), the existing contents of the accumulator 29 (6=0110) are added to the contents of the binary adder 27 to yield a sum of 10 (6+4=10=01010). The units digit 0 is then extracted from the sum of 10 by the units digit extractor 28 and a count of 0 (0000) is applied to the accumulator 29. The 0 count in the accumulator 29 after the final operation of the parity-checking apparatus 7, an indication that the coded information derived from the label 3 has met system parity requirements, is sensed by the zero-sensing gates 32 and an output signal is produced thereby and applied to the AND gate 9 (FIG. 1) for further processing in the manner previously described.

Modifications

Although a parity-checking apparatus 7 has been described which employs zero-sensing gates 32 for sensing the contents of the accumulator 29, it is to be appreciated that various modifications of the partity-checking apparatus 7 are possible. For example, instead of sensing the contents of the accumulator 29 after the coded signal representative of the parity check integer $R_C$ has been processed by the combination of apparatus including the code converter 25, the binary adder 27, the units digit extractor 28, and the accumulator 29, it is possible to sense the contents or output of the binary adder 27 or the units digit extractor 28 only and, if such contents or output has a predetermined correct value, to provide an indication to the AND gate 9 that parity requirements have been satisfied. Additionally, it is possible for the coded signal representative of the parity check integer $R_C$ to be directly checked against the last signal stored in the accumulator 29 at the conclusion of the processing of the coded signals representative of the digits $a_0$ . . . $a_9$ and, if the values of the signals bear a predetermined relationship to each other, to provide an indication to the AND gate 9 that parity requirements have been satisfied.

It is further to be noted that if an odd number of digits $a_0$ . . . $a_n$ are employed in the coded label of the system, the ODD-EVEN flip-flop 20 is pre-set to "EVEN" such that the next signal produced thereby, corresponding to the first coded signal representative of the digit $a_0$, is an "ODD" signal.

Also, it is to be noted that it is possible for the SHIFT signals applied to the parity-checking apparatus 7 to be generated after each of the coded signal representative of the digits $a_0$ . . . $a_n$ has been processed in the code converter 25, each SHIFT signal simultaneously serving to provide an ADD command to the accumulator 29 and setting the ODD-EVEN flip-flop 20 to the state corresponding to the next coded signal to be processed in the code converter 25. In this case, the "START" signal from the storage registers 8 would pre-set the ODD-EVEN flip-flop 20 to its "EVEN" state to provide an "EVEN" signal corresponding to the coded signal representative of the digit $a_0$. Other modifications and changes will be obvious to those skilled in the art without departing from the invention.

What is claimed is:

1. A system for processing information relating to an object comprising:

a plurality of code elements associated with the object and arranged in a predetermined coded pattern to represent a plurality of integers $a_0$ . . . $a_n$ relating to the object, each integer having a given value, and a parity check integer having a value related to the values of the integers $a_0$ . . . $a_n$;

means adapted to sense each of the integers $a_0$ . . . $a_n$ and the parity check integer encoded in the plurality of code elements and to produce a signal representative thereof, each of the signals having a value corresponding to the value of the associated integer; and parity-checking apparatus comprising:

control means operative to produce first and second control signals, the first control signals corresponding to predetermined ones of the signals representative of the integers $a_0$ . . . $a_n$ and the second control signals corresponding to the remaining ones of the signals representative of the integers $a_0$ . . . $a_n$;

circuit means operative to receive each of the signals representative of an integer $a_0$ . . . $a_n$ and a corresponding first or second control signal from the control means, said circuit means being operative in response to receiving each first control signal from the control means and a corresponding predetermined one of the signals representative of the integers $a_0$ . . . $a_n$ to provide an output signal of a value bearing a predetermined first relationship to the value of the corresponding signal and being operative in response to receiving each second control signal from the control means and a corresponding remaining one of the signals representative of the integers $a_0$ . . . $a_n$ to provide an output signal of a value bearing a predetermined second relationship to the value of the corresponding signal;

storage means adapted to store signals;

arithmetic means connected to the circuit means and to the storage means and operative to add the value of each output signal provided by the circuit means and a signal stored in the storage means and to provide an output signal to the storage means having a value bearing a predetermined relationship to the sum of the values of the output signal provided by the circuit means and the signal stored in the storage means, said storage means being operable to store the output signal provided by the arithmetic means; and means operable to check the value of the last signal stored in the storage means after processing the signals representative of the integers $a_0$ . . . $a_n$ against the value of the signal representative of the parity check integer and to produce a predetermined output condition of the values of the signals bear a predetermined relationship to each other.

2. A system for processing information relating to an object in accordance with claim 1 wherein:

the integers $a_0$ . . . $a_n$ each have a value between 0 and 9;

the parity check integer has a value between 0 and 9;

said control means is operative to produce first control signals corresponding to alternate ones of the signals representative of the integers $a_0$ . . . $a_n$ and to produce second control signals corresponding to the remaining ones of the signals representative of the integers $a_0$ . . . $a_n$; and the circuit means is operative in response to receiving a first control signal from the control means and a corresponding alternate one of the signals representative of the integers $a_0$ . . . $a_n$ to provide an output signal of the same value as the value of the corresponding alternate signal, and operative in response to receiving a second control signal from the control means and a corresponding remaining one of the signals representative of the integers $a_0 \ldots a_n$ to provide an output signal of a value equal to the sum of the values of the individual units and tens digits of a quantity representing a value twice that of the remaining corresponding signal.

3. A system for processing information relating to an object in accordance with claim 2 wherein:

the predetermined relationship of the value of the output signal produced by the arithmetic means to the sum of the values of the output signal provided by the circuit means and the signal stored in the storage means is that the value of the output signal produced by the arithmetic means is equal to the value of the units digit of the value of the sum of the values of the output signal provided by the circuit means and the signal stored in the storage means; and the predetermined relationship between the value of the last signal stored in the storage means and the value of the signal representative of the parity check integer is that the units digit of the sum of the signals has a value of 0.

4. A system for processing information relating to an object in accordance with claim 2 wherein the control means includes a flip-flop circuit.

5. A system for processing information relating to an object comprising:

a plurality of code elements associated with the object and arranged in a predetermined coded pattern to represent a plurality of integers $a_0 \ldots a_n$ relating to the object, each integer having a given value, and a parity check integer having a value related to the values of the integers $a_0 \ldots a_n$;

means adapted to sense each of the integers $a_0 \ldots a_n$ and the parity check integer encoded in the plurality of code elements and to produce a signal representative thereof, each of the signals having a value corresponding to the value of the associated integer; and parity-checking apparatus comprising:

control means operative to produce first and second control signals, the first control signals corresponding to predetermined ones of the signals representative of the integers $a_0 \ldots a_n$ and the second control signals corresponding to the remaining ones of the signals representative of the integers $a_0 \ldots a_n$;

circuit means operative to receive each of the signals representative of an integer $a_0 \ldots a_n$ and a corresponding first or second control signal from the control means, said circuit means being operative in response to receiving each first control signal from the control means and a corresponding predetermined one of the signals representative of the integers $a_0 \ldots a_n$ to provide an output signal of a value bearing a predetermined first relationship to the value of the corresponding signal and being operative in response to receiving each second control signal from the control means and a corresponding remaining one of the signals representative of the integers $a_0 \ldots a_n$ to provide an output signal of a value bearing a predetermined second relationship to the value of the corresponding signal;

storage means adapted to store signals;

adder means connected to the circuit means and to the storage means and operative to add the value of each output signal provided by the circuit means and a signal stored in the storage means and to produce a sum signal having a value equal to the sum;

extractor means connected to the adder means and to the storage means and adapted to receive each sum signal produced by the adder means and to provide an output signal to the storage means having a value equal to the value of the units digit of the value of the sum signal, said storage means being operable to store the output signal provided by the extractor means; and means operative to check the value of the last signal stored in the storage means after processing the signals representative of the integers $a_0 \ldots a_n$ against the value of the signal representative of the parity check integer and to produce a predetermined output condition if the values of the signals bear a predetermined relationship to each other.

6. In a coded-vehicle identification system including a vehicle on which a coded label is disposed; said label being coded to represent a plurality of integers $a_0 \ldots a_n$, each integer having a given value; and a parity check integer having a value related to the values of the plurality of integers $a_0 \ldots a_n$, apparatus comprising:

acquisition means adapted to acquire from said coded label a plurality of successive signals representative of the plurality of integers $a_0 \ldots a_n$, each of said plurality of signals having a value corresponding to the value of the associated integer, and a parity signal representative of the parity check integer, said parity signal having a value corresponding to the value of the parity check integer; and parity-checking apparatus comprising:

control means operative to produce first and second control signals, the first control signals corresponding to predetermined ones of the signals representative of the plurality of integers $a_0 \ldots a_n$ and the parity check integer and the second control signals corresponding to the remaining ones of the signals representative of the integers $a_0 \ldots a_n$ and the parity check integer;

circuit means operative to receive each of the signals representative of an integer $a_0 \ldots a_n$ and the parity check integer and a corresponding first or second control signal from the control means, said circuit means being operative in response to receiving each first control signal from the control means and a corresponding predetermined one of the signals representative of the integers $a_0 \ldots a_n$ and the parity check integer to provide an output signal of a value bearing a predetermined first relationship to the value of the corresponding signal and being operative in response to receiving each second control signal from the control means and a corresponding remaining one of the signals representative of the integers $a_0 \ldots a_n$ and the parity check integer to provide an output signal of a value bearing a predetermined second relationship to the value of the corresponding signal;

storage means adapted to store signals;

adder means connected to the circuit means and to the storage means and operative to add the value of each output signal provided by the circuit means and a signal stored in the storage means and to produce a sum signal having a value equal to the sum;

extractor means connected to the adder means and to the storage means and adapted to receive each sum signal produced by the adder means, said extractor means being operative in response to each sum signal produced by the adder means to provide an output signal to the storage means having a value equal to the value of the units digit of the value of the sum signal, said storage means being operable to store the output signal provided by the extractor means; and signal-sensing means connected to the storage means and operative to sense the signals stored in the storage means and in response to sensing a signal stored in the storage means having a predetermined value to produce an output signal.

7. In a coded-vehicle identification system in accordance with claim 6 wherein:

the integers $a_0 \ldots a_n$ each have a value between 0 and 9;

the parity check integer has a value between 0 and 9;

said control means is operative to produce first control signals corresponding to the signals representative of the integers $\ldots a_{n-5}$, $a_{n-3}$, and $a_{n-1}$, and the parity check integer, and to produce second control signals corresponding to the signals representative of the integers $\ldots a_{n-4}$, $a_{n-2}$, and $a_n$; and the circuit means is operative in response to receiving a first control signal from the control means and a corresponding one of the signals representative of the integers $\ldots a_{n-5}$, $a_{n-3}$, and $a_{n-1}$, and the parity check integer, to provide an output signal of the same value as the value of the corresponding signal, and operative in response to receiving a second control signal from the control means and a corresponding one of the signals representative of the integers $\ldots a_{n-4}$, $a_{n-2}$, and $a_n$ to provide an output signal of a value equal to the sum of the values of the individual units and tens digits of a quantity representing a value twice that of the corresponding signal.

8. In a coded-vehicle identification system in accordance with claim 7 wherein the signal-sensing means produces an output signal when a signal having a value of 0 is stored in the storage means.

9. In a coded-vehicle identification system in accordance with claim 7 wherein the control means includes a flip-flop circuit.

10. In a coded-vehicle identification system in accordance with claim 7, further comprising:

AND gate means having a first input terminal coupled to the signal-sensing means, a second input terminal, and an output terminal;

a plurality of data storage means coupled to the acquisition means and to the output terminal of the AND gate means for receiving and retaining the plurality of signals representative of the integers $a_0 \ldots a_n$ and the parity check integer;

label data recognition means coupled to the plurality of data storage means and to the second input terminal of the AND gate means and operative to examine the contents of the data storage means and to provide an output signal to the second input terminal of the AND gate means if the contents of the data storage means are determined to pertain to label data;

said AND gate means being operative in response to receiving an output signal from the signal-sensing means at the first input terminal thereof and an output signal from the label data recognition means at the second input terminal thereof to produce an output signal at the output terminal thereof; and said plurality of data storage means being operable to transfer therefrom the plurality of signals representative of the integers $a_0 \ldots a_n$ and the parity check integer in response to an output signal from the AND gate means.

11. A parity-checking apparatus for processing a plurality of successive input signals, each having a given value, and a parity signal having a given value, comprising:

control means operative to produce first and second control signals, the first control signals corresponding to predetermined ones of the input signals and the second control signals corresponding to the remaining ones of the input signals;

circuit means operative to receive each of the input signals and a corresponding first or second control signal from the control means, said circuit means being operative in response to receiving each first control signal from the control means and a corresponding predetermined one of the input signals to provide an output signal of a value bearing a predetermined first relationship to the value of the corresponding input signal and being operative in response to receiving each second control signal from the control means and a corresponding remaining one of the input signals to provide an output signal of a value bearing a predetermined second relationship to the value of the corresponding input signal;

storage means adapted to store signals;

arithmetic means connected to the circuit means and to the storage means and operative to add the value of each output signal provided by the circuit means and a signal stored in the storage means and to provide an output signal to the storage means having a value bearing a predetermined relationship to the sum of the values of the output signal provided by the circuit means and the signal stored in the storage means, said storage means being operable to store the output signal provided by the arithmetic means; and means operable to check the value of the last signal stored in the storage means after processing the input signals against the value of the parity signal and to produce a predetermined output condition if the values of the signals bear a predetermined relationship to each other.

12. A parity-checking apparatus in accordance with claim 11 wherein:

the input signals each have a value between 0 and 9;

the parity signal has a value between 0 and 9;

said control means is operative to produce first control signals corresponding to alternate ones of the input signals and to produce second control signals corresponding to the remaining ones of the input signals; and the circuit means is operative in response to receiving each first control signal from the control means and a corresponding alternate one of the input signals to provide an output signal of the same value as the value of the corresponding alternate input signal, and operative in response to receiving each second control signal from the control means and a corresponding remaining one of the input signals to provide an output signal of a value equal to the sum of the values of the individual units and tens digits of a quantity representing a value twice that of the corresponding remaining input signal.

13. A parity-checking apparatus in accordance with claim 12 wherein:

the predetermined relationship of the value of the output signal produced by the arithmetic means to the sum of the values of the output signal provided by the circuit means and the signal stored in the storage means is that the value of the output signal produced by the arithmetic means is equal to the value of the units digit of the value of the sum of the values of the output signal provided by the circuit means and the signal stored in the storage means; and the predetermined relationship between the value of the last signal stored in the storage means and the value of the parity signal is that the units digit of the sum of the signals has a value of 0.

14. A parity-checking apparatus for processing a plurality of successive input signals, each having a given value, and a parity signal having a given value, comprising:

control means operative to produce first and second control signals, the first control signals corresponding to predetermined ones of the input signals and the parity signal and the second control signals corresponding to the remaining ones of the input signals;

circuit means operative to receive each of the input signals and the parity signal and a corresponding first or second control signal from the control means, said circuit means being operative in response to receiving each first control signal from the control means and a corresponding predetermined one of the input signals and the parity signal to provide an output signal of a value bearing a predetermined first relationship to the value of the corresponding signal, and operative in response to receiving each second control signal from the control means and a corresponding remaining one of the input signals to provide an output signal of a value bearing a predetermined second relationship to the value of the corresponding signal;

storage means adapted to store signals;

adder means connected to the circuit means and to the storage means and operative to add the value of each output signal provided by the circuit means and a signal stored in the storage means and to produce a sum signal having a value equal to the sum;

extractor means connected to the adder means and to the storage means and adapted to receive each sum signal produced by the adder means, said extractor means being operative in response to each sum signal produced by the adder means to provide an output signal to the storage means having a value equal to the value of the units digit of the value of the sum signal, said storage means being operable to store the output signal provided by the extractor means; and signal-sensing means connected to the storage means and operative to sense the signals stored in the storage means and in response to sensing a signal stored in the storage means having a predetermined value to produce an output signal.

15. A parity-checking apparatus in accordance with claim 14 wherein the signal-sensing means produces an output signal when a signal having a value of 0 is stored in the storage means.

16. A parity-checking apparatus for processing a plurality of input signals, each having a given value, comprising:

control means operative to produce first and second control signals, the first control signals corresponding to predetermined ones of the input signals and the second control signals corresponding to the remaining ones of the input signals;

circuit means operative to receive each of the input signals and a corresponding first or second control signal from the control means, said circuit means being operative in response to receiving each first control signal from the control means and a corresponding predetermined one of the input signals to multiply the value of the corresponding input signal by a first predetermined quantity, and operative in response to receiving each second control signal from the control means and a corresponding remaining one of the input signals to multiply the value of the corresponding input signal by a second predetermined quantity, said circuit means further adding together the values of the units and tens digit of each product and providing an output signal having a value equal to the sum;

storage means adapted to store signals;

adder means connected to the circuit means and to the storage means and operative to add the value of each output signal provided by the circuit means and a signal stored in the storage means and to produce a sum signal having a value equal to the sum;

extractor means connected to the adder means and to the storage means and adapted to receive each sum signal produced by the adder means, said extractor means being operative in response to each sum signal produced by the adder means to provide an output signal to the storage means having a value equal to the value of the units digit of the value of the sum signal, said storage means being operable to store the output signal provided by the extractor means; and signal-sensing means connected to the storage means and operative to sense the signals stored in the storage means and in response to sensing a signal stored in the storage means having a predetermined value to produce an output signal.

17. A parity-checking apparatus in accordance with claim 16 wherein:

the input signals each have a value between 0 and 9;

the first predetermined quantity is 1;

the second predetermined quantity is 2; and the predetermined value of a signal stored in the storage means is 0.

References Cited

UNITED STATES PATENTS

| | | | |
|---|---|---|---|
| 3,098,994 | 7/1963 | Brown | 340—146.1 |
| 3,417,231 | 12/1968 | Stites et al. | 235—61.11 |

MALCOLM A. MORRISON, Primary Examiner

CHARLES E. ATKINSON, Assistant Examiner

U.S. Cl. X.R.

235—61.11, 153